(12) United States Patent  
Lim et al.

(10) Patent No.: US 9,598,036 B2
(45) Date of Patent: Mar. 21, 2017

(54) SENSING DEVICE AND METHOD OF CONSTRUCTION EQUIPMENT

(71) Applicant: Doosan Infracore Co., Ltd., Incheon (KR)

(72) Inventors: Ji Yeon Lim, Seoul (KR); Jung Mug Shin, Gyeonggi-do (KR); Chi Kook Park, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/655,253

(22) PCT Filed: Dec. 5, 2013

(86) PCT No.: PCT/KR2013/011202
§ 371 (c)(1),
(2) Date: Jun. 24, 2015

(87) PCT Pub. No.: WO2014/104606
PCT Pub. Date: Jul. 3, 2014

(65) Prior Publication Data
US 2015/0343976 A1 Dec. 3, 2015

(30) Foreign Application Priority Data
Dec. 24, 2012 (KR) .......... 10-2012-0152158

(51) Int. Cl.
*B60Q 1/00* (2006.01)
*B60R 21/013* (2006.01)
(Continued)

(52) U.S. Cl.
CPC .......... *B60R 21/013* (2013.01); *B66C 15/06* (2013.01); *E02F 9/24* (2013.01); *E02F 9/261* (2013.01);
(Continued)

(58) Field of Classification Search
CPC ............ B60R 1/00; B60R 2300/301; B60R 2300/8093; B60R 2011/004; B60R 2300/105; B66C 15/04; B66C 15/06
(Continued)

(56) References Cited

U.S. PATENT DOCUMENTS 7,307,655 B1 * 12/2007 Okamoto .......... G06K 9/00791
348/373
7,369,041 B2 * 5/2008 Nakanishi ................ B60R 1/00
340/435

(Continued)

FOREIGN PATENT DOCUMENTS

JP 07-102596 A 4/1995
JP 2011-179279 A 9/2011
(Continued)

OTHER PUBLICATIONS

International Search Report with English Translation mailed Mar. 21, 2014 for corresponding International Application No. PCT/KR2013/011202, 5 pages.

Primary Examiner — John A Tweel, Jr.
(74) Attorney, Agent, or Firm — John D. Veldhuis-Kroeze; Westman, Champlin & Koehler, P.A.

(57) ABSTRACT

The present invention relates to a device and a method for sensing (detecting) rear and side areas of construction equipment. The present invention comprises: setting a certain distance from the construction machine (or vehicles) as a safe-distance area (work pattern area); patterning fixed objects within the set safe-distance area; sounding an alarm and/or displaying a captured (or detected) image on a display when other objects excluding the fixed objects that are sensed by the construction machine (that is, the fixed objects that are patterned) are sensed.

13 Claims, 11 Drawing Sheets (51) Int. Cl.
*B66C 15/06* (2006.01)
*E02F 9/24* (2006.01)
*E02F 9/26* (2006.01)
*G01S 15/93* (2006.01)
*B60R 11/00* (2006.01)

(52) U.S. Cl.
CPC ....... *G01S 15/931* (2013.01); *B60R 2011/004* (2013.01); *B60R 2300/105* (2013.01); *B60R 2300/301* (2013.01); *B60R 2300/8093* (2013.01)

(58) Field of Classification Search
USPC ........................ 340/435; 345/420; 348/148
See application file for complete search history.

(56) References Cited

U.S. PATENT DOCUMENTS

| | | | | |
|---|---|---|---|---|
| 8,593,454 | B2* | 11/2013 | Kiyota | B60R 1/00 345/419 |
| 2008/0309784 | A1* | 12/2008 | Asari | B60R 1/00 348/222.1 |
| 2016/0125666 | A1* | 5/2016 | Izumikawa | E02F 9/261 60/301 |

FOREIGN PATENT DOCUMENTS

| | | |
|---|---|---|
| JP | 2012-074929 A | 4/2012 |
| JP | 2012-082608 A | 4/2012 |
| JP | 2012-107395 A | 6/2012 |

* cited by examiner

FIG. 1

--Prior Art--

FIG. 2A

--Prior Art--

$b^2 = a^2 + c^2 - 2ca \cos \beta$ $\dfrac{-b^2 + (a^2 + c^2)}{2ca} = \cos \beta$ $\beta = \cos^{-1} \dfrac{-b^2 + (a^2 + c^2)}{2ca}$ $\delta = 90 - (\beta - \theta)$

$e = a/\cos \delta, \quad f = a/\sin \delta$ $K = \sqrt{(X + e)^2 + (Y + f)^2}$ $\omega = \tan^{-1} \dfrac{Y + f}{X + e}$ a,b : DISTANCE FROM SENSOR TO FIXED OBJECT
c : DISTANCE BETWEEN SENSORS
α : ANGLE BETWEEN b AND c
β : ANGLE BETWEEN a AND c
θ: INSTALLATION ANGLE OF a AND b SENSORS
X: DISTANCE (WIDTH) FROM CENTER TO INSTALLED SENSOR
Y: DISTANCE (LENGTH) FROM CENTER TO INSTALLED SENSOR
e: DISTANCE (WIDTH) FROM OUTER BOUNDARY TO FIXED OBJECT
f: DISTANCE (LENGTH) FROM OUTER BOUNDARY TO FIXED OBJECT
K: STRAIGHT DISTANCE FROM CENTER TO FIXED OBJECT
ω: ANGLE OF FIXED OBJECT
ρ: ROTATIONAL ANGLE OF UPPER BODY

FIG. 6

$a^2 = b^2 + c^2 - 2cb \cos \alpha$ $\dfrac{-a^2 + (b^2 + c^2)}{2cb} = \cos \alpha$ $\alpha = \cos^{-1} \dfrac{-a^2 + (b^2 + c^2)}{2cb}$ $\delta = 90 - \alpha$ -> NO ANGLE IS FORMED BETWEEN SENSORS($\theta = 0$)

$e = \dfrac{a}{\cos \delta}$, $f = \dfrac{a}{\sin \delta}$ $K = \sqrt{(X + e)^2 + (f - Y)^2}$ $\sigma = \tan^{-1} \dfrac{f - Y}{X + e}$ $\omega = 90 + \sigma - \rho$ a, b: DISTANCE FROM SENSOR TO FIXED OBJECT c: DISTANCE BETWEEN SENSORS α: ANGLE BETWEEN b AND c β: ANGLE BETWEEN a AND c θ: INSTALLATION ANGLE OF a AND b SENSORS

X: DISTANCE (WIDTH) FROM CENTER TO INSTALLED SENSOR

Y: DISTANCE (LENGTH) FROM CENTER TO INSTALLED SENSOR e: DISTANCE (WIDTH) FROM OUTER BOUNDARY TO FIXED OBJECT f: DISTANCE (LENGTH) FROM OUTER BOUNDARY TO FIXED OBJECT

K: STRAIGHT DISTANCE FROM CENTER TO FIXED OBJECT

ω: ANGLE OF FIXED OBJECT

ρ: ROTATIONAL ANGLE OF UPPER BODY

SENSING DEVICE AND METHOD OF CONSTRUCTION EQUIPMENT

CROSS-REFERENCE TO RELATED APPLICATION

This application is a Section 371 National Stage Application of International Application No. PCT/KR2013/011202, filed Dec. 5, 2013 and published, not in English, as WO 2014/104606 on Jul. 3, 2014.

FIELD OF THE DISCLOSURE

The present invention relates to a sensing device of a construction machine and a method thereof, and more particularly, to a device and a method of sensing (detecting) rear and side areas of a construction machine.

BACKGROUND OF THE DISCLOSURE

A construction machine (construction vehicle) is used in civil engineering work or architectural work and a type of construction machine includes an excavator, a grader, a crane, or a conveying machine. Generally, the construction machine operates by manipulating a handle, a pedal, a stick, or a joystick. Further, the construction machine which is produced in recent years includes a display device and a state of the equipment and important data are displayed through the display device of the construction machine for a user (that is, an operator). Therefore, the user of the construction machine may efficiently operate the construction machine using the state of the equipment and information which are displayed on the display device.

In the meantime, a construction machine such as an excavator is divided into an upper body and a lower body and has a rotating function. When the construction machine is driven or operated, the upper body and/or the lower body rotate and operates and it is hard for the operator (user) to observe a rear or side area of the construction machine in a cabin (inside the vehicle) so that it is required to prevent negligent accident. Therefore, when the construction machine is driven or operates, a system which observes a rear and/or side area is required.

Figure 1:
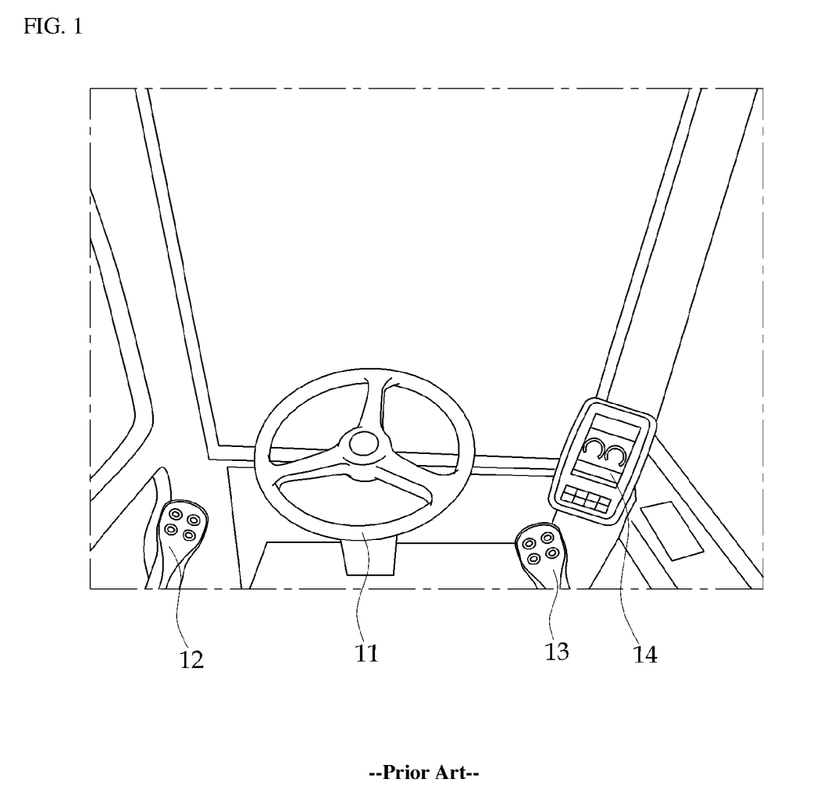
FIG. 1 is a view illustrating an inner portion of a cabin of a construction machine of the related art.

FIG. 1 is a view illustrating an inner portion of a cabin of a construction machine of the related art.

The cabin of the construction machine is a space where a manipulating device which allows an operator (or a user) to operate the construction machine is provided. As illustrated in FIG. 1, the cabin of the construction machine includes a handle 11, a pair of joysticks 12 and 13, and a display (or an instrument panel) 14 as manipulating devices.

Figure 2A:
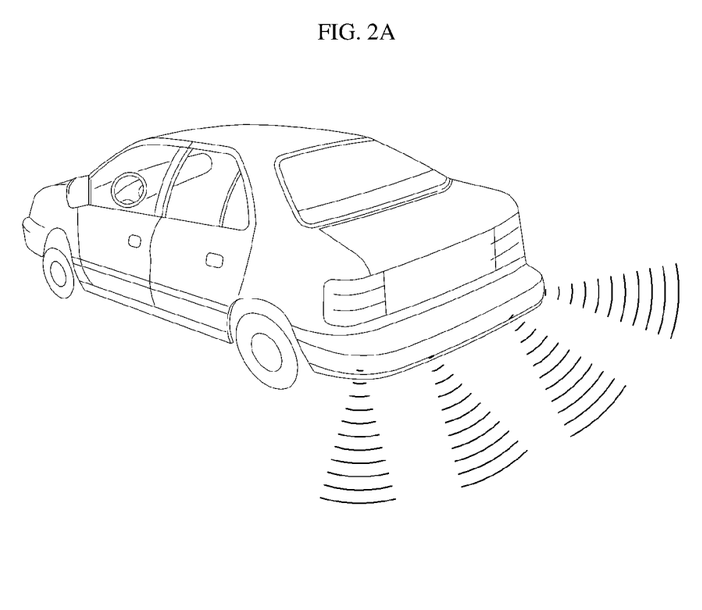
FIGS. 2A and 2B are block diagrams of an ultrasonic rear sensing device which is applied to a vehicle of the related art.
Figure 2B:
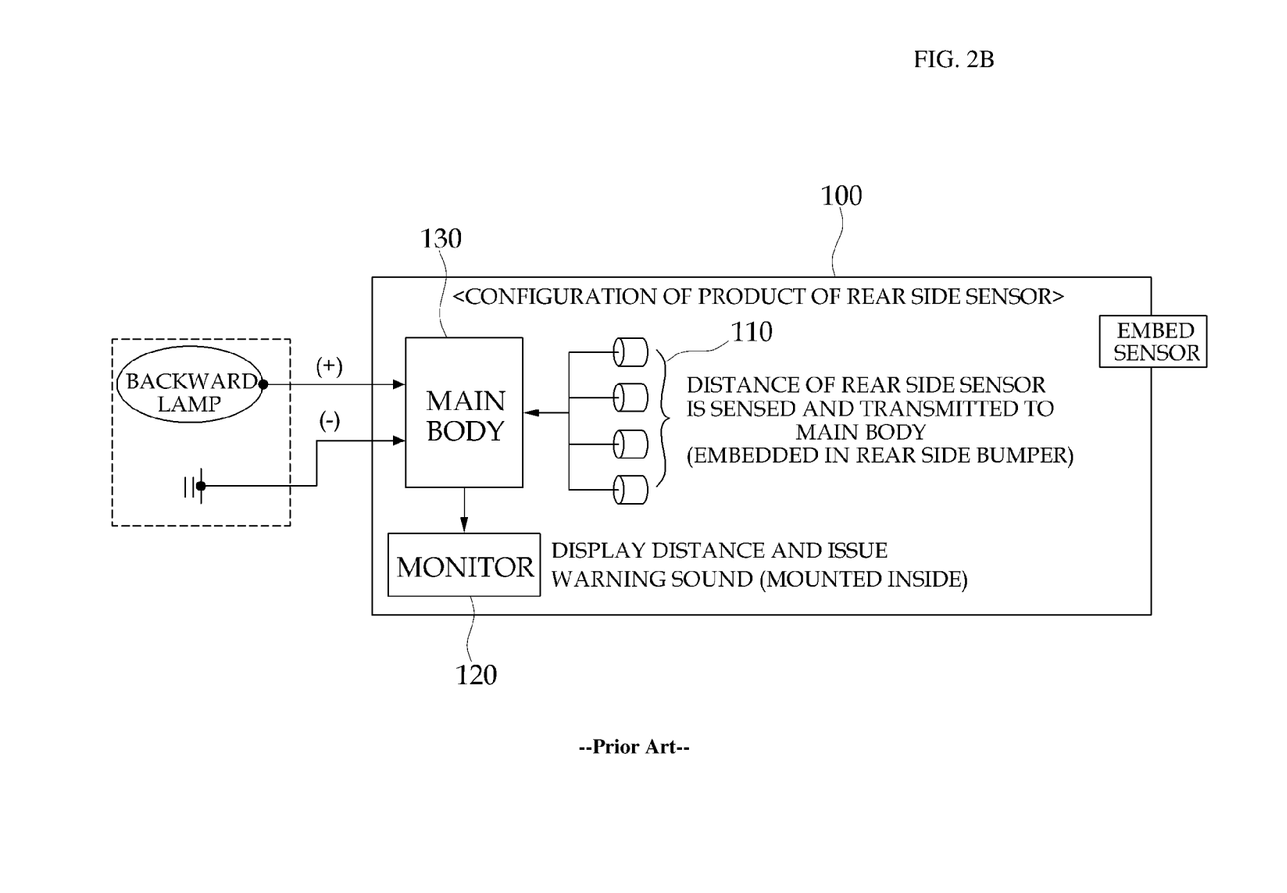

FIGS. 2A and 2B are block diagrams of an ultrasonic rear sensing device which is applied to a vehicle of the related art.

As illustrated in FIG. 2A, the ultrasonic rear sensing device 100 of the vehicle has four ultrasonic sensors 110 at a rear side of the vehicle, generally, on a rear side bumper and when an object within a predetermined distance is detected, as illustrated in FIG. 2B, a warning sign is displayed on a monitor (which is provided in the vehicle) 120 provided in a main body 130 of the vehicle and also an alarm sound is issued. That is, when a driver puts a reverse gear to backwardly drive the vehicle, an ultrasonic sensor 110 built at a rear area of the vehicle senses an object within a predetermined distance and the distance is displayed on the monitor 120 and an alarm sound is issued.

However, the ultrasonic rear sensing device of a vehicle of the related art is not applied to a construction machine which does not sense the side area. This is because the construction machine is not only forwardly and backwardly driven like a vehicle but also the upper body and the lower body rotate, so that an object at the side area and an approaching person need to be sensed when the construction machine rotates. Further, when the ultrasonic rear sensing device of a vehicle of the related art is applied to the construction machine, the ultrasonic sensor senses a fixed object which is located within a predetermined distance from the construction vehicle and continuously issues an alarm sound or displays a warning sign, which may disturb a driver (an operator) of the construction machine from working.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

A technical object of the present invention provides a sensing device which senses a rear area and a side area of a construction machine in consideration of characteristics of the construction machine and a method thereof.

Further, the present invention sets a rotation safe-distance from a rear area and a side area of the construction machine and patterns fixed objects within the rotation safe-distance to prevent an unnecessary alarm and a warning sign.

Furthermore, the present invention prevents a negligent accident and provides convenience to a driver by issuing an alarm sound or displaying a patterned object on an instrument panel to a driver when a moving object is sensed within the set rotation safe-distance.

In order to solve the technical problem described above, the present invention provides: an object sensing method of a construction machine, including: (A) setting a safe-distance area and obtaining location values of at least one fixed object to form a work area pattern; (B) updating the location values by detecting an object in the work area pattern in accordance with rotation and movement of the construction machine; (C) determining whether the detected object is a fixed object in the work area pattern; and (D) notifying that there is an object detected in the work area pattern when it is determined that the detected object is not the fixed object.

In Step A, the location values of the fixed object may include a distance from a center of the construction machine to the fixed object and an angle of the fixed object and the location values may be obtained using a sensing sensor mounted at the side of the construction machine.

In Step (A), the safe-distance area may be set by distinguishing a rotation safe-distance area and a sensor recognition area in consideration of an operation rotational radius of the construction machine.

In Step (C), when the location values of the fixed object of the work area pattern formed in Step (A) are equal to the location values of the object detected in Step (B), it may be determined that the detected object is the fixed object.

Step (D) may include notifying that there is an object detected within the work area pattern using an alarm sound.

Step (D) may include capturing, by a camera, an object which is detected in the work area pattern; and displaying a captured image of the object with the work area pattern.

The method may further include: determining whether the detected object is in the rotation safe-distance area of the work area pattern when it is determined that the detected object is the fixed object within the work area pattern; and displaying an image obtained by capturing the detected object when it is determined that the detected object is within the rotation safe-distance area of the work area pattern.

In order to solve the technical problem described above, the present invention provides: an object sensing device of a construction machine, including: a display which is mounted in a vehicle of a construction machine and displays a work area pattern and a captured image of an object; at least one camera which is mounted in a side area and a rear area of the construction machine to capture an image of an object; at least one sensor which is mounted in the side area and the rear area of the construction machine and senses positions of a fixed object and a moving object; and a control unit which controls to set a safe-distance area in consideration with the sensor, perform a patterning work of the work area using sensing information on the fixed object, and display a captured image of the moving object on the display and issue a warning sound when the moving object is sensed within the set safe-distance area.

The control unit may obtain location values of the fixed object in the work area pattern through the sensor in a stop state of the construction machine and update the location values by detecting an object in the work area pattern through the sensor in a rotated state of the construction machine, and then compare the obtained location values with the updated location values so that when the two location values are equal to each other, it is determined that the detected object is a fixed object in the work area pattern.

The control unit may obtain location values of the fixed object measured by the sensor in a stop state of the construction machine and obtain the location values of the fixed object measured by the sensor in a rotated state of the construction machine, and then perform the patterning work of the work area using the two obtained location values.

According to the present invention, the location values of the fixed objects are obtained using a sensor and the work area of the construction machine is patterned as an image using the obtained location values, so that an unnecessary warning sound generated by sensing (detecting) the fixed object may be prevented.

Further, according to the present invention, the work area pattern is defined and when an object which is detected (sensed) within the work area pattern (specifically, the side area and the rear area which are a blind spot of the construction machine) approaches, the work area pattern is displayed together with the image of the captured object, thereby calling a driver's attention and preventing a negligent accident.

DETAILED DESCRIPTION

The present invention is applied to an ultrasonic sensing device of a construction machine and a method thereof. However, the present invention is not limited thereto and may also be applied to all technical fields to which the spirit of the present invention may be applied.

Hereinafter, exemplary embodiments of the present invention will be described in detail with reference to the accompanying drawings. Substantially same components in the following description and the accompanying drawings may be denoted by the same reference numerals and redundant description will be omitted. Further, in the description of the present invention, if it is considered that specific description of related known configuration or function may unnecessarily cloud the gist of the present invention, the detailed description thereof will be omitted.

Meanwhile, a term "and/or" described in the present invention includes a combination of a plurality of related items or any item among the plurality of related items.

A technical term "display device" used in the present invention has a comprehensive meaning including an analog or digital display device and may be simply referred to as a "display", "monitor", or an "instrument panel". Further, the "display device" of the present invention may be a device which is configured by one or more monitors or instrument panels. Furthermore, the "display device" of the present invention may be a device combined with a control unit (or a processor) which operates the "display" or an independent device.

A technical term "a construction machine" used in the present invention is not limited to only a machine which is used for construction purpose literally, but has a comprehensive meaning which collectively refers to all vehicles to which the display device according to the present invention is applied.

Technical terms "safe-distance area" and "work area" used in the present invention is a term referring to a surrounding area of the construction machine in order to sense an object by an object sensing device according to the present invention. The "work area" and "safe-distance area" are not limited to a literal meaning to define an area, but has a comprehensive meaning collectively referring to an area where the object sensing device of the construction machine according to the present invention patterns an image. For the convenience of description of the present invention, the "safe-distance area" and the "work area" may be mixed to each other.

A basic concept of the present invention sets a predetermined distance from the construction machine (or vehicle) as a safe-distance area (a work pattern area), patterns fixed objects within the set safe-distance area, and issues an alarm warning and/or displays a captured (or detected) image on a display, when other moving objects excluding the fixed objects (that is, patterned fixed objects) sensed by the construction machine are sensed.

Figure 3:
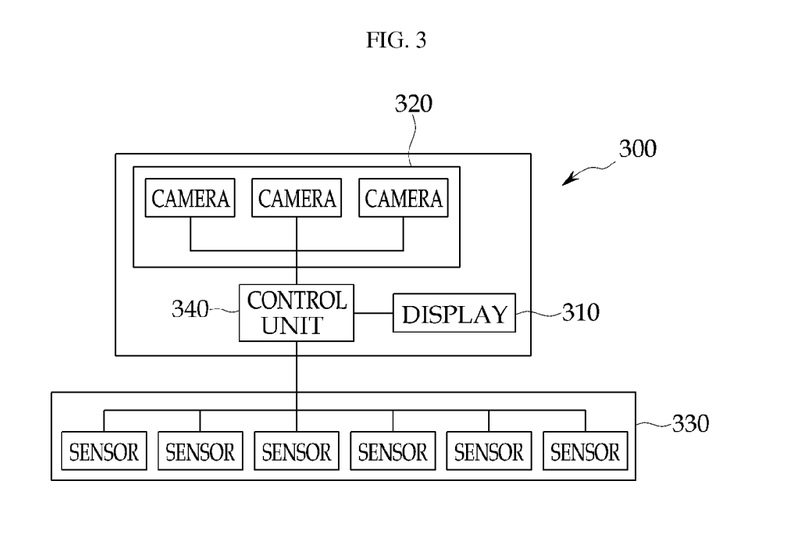
FIG. 3 is a block diagram of a sensing device of a construction machine according to the present invention as an exemplary embodiment of the present invention.

FIG. 3 is a block diagram of a sensing device of a construction machine according to the present invention as an exemplary embodiment of the present invention.

As illustrated in FIG. 3, an object sensing device 300 of a construction machine according to the present invention includes a display 310 which is mounted in a vehicle of the construction machine and displays a work area pattern and an image of a captured object, at least one camera 320 which is mounted in a side area and a rear area to capture an image of an object or person, at least one ultrasonic sensor 330 which senses positions of a fixed object and a moving object and is mounted in the side area and the rear area of the construction machine, and a control unit 340 which controls to set a safe-distance area in consideration of the ultrasonic sensor 330, perform patterning work of the work area using sensing information on the sensed fixed object, and display a captured image on the display 310 and issue a warning sound when the moving object is sensed within the set safe-distance area. In the meantime, according to another exemplary embodiment, the ultrasonic sensor 330 may be a sensor using laser and a sensing medium may be implemented by various methods.

Figure 4:
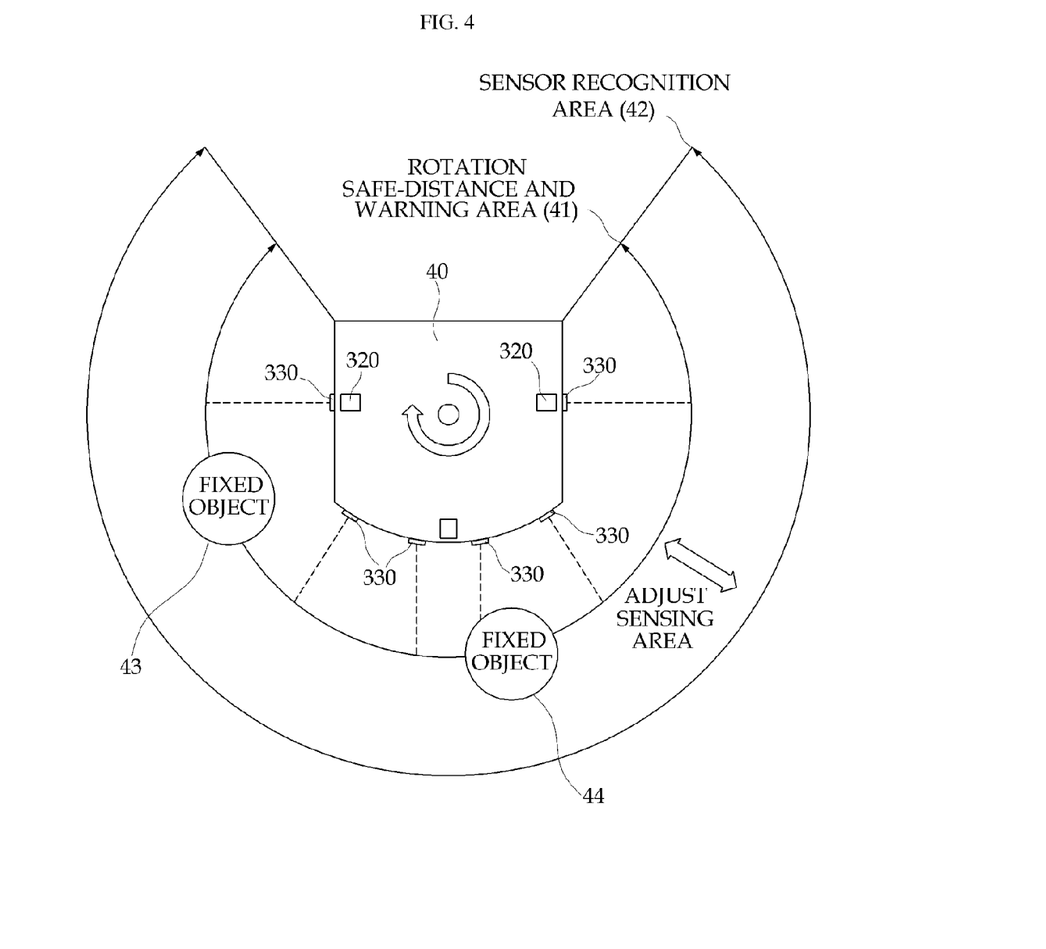
FIG. 4 is a view patterning a safe-distance by a sensing method according to the present invention as an exemplary embodiment of the present invention.

FIG. 4 is a view patterning a safe-distance by a sensing method according to the present invention as an exemplary embodiment of the present invention.

As illustrated in FIG. 4, detecting (monitoring) cameras 320 are mounted in both sides and a rear side of the construction machine (for example, excavator) 40 and six ultrasonic sensors 330 are mounted in the side and the rear side of the construction machine.

Referring to FIG. 4, in a blind spot of the construction machine (for example, excavator), a "rotation safe-distance" and a "warning area 41" may be set and further, a sensor recognition area 42" may be set.

That is, the control unit 340 makes a pattern of a safe-distance in consideration of a performance of the ultrasonic sensor 330 and a work area of the construction machine. In this case, the control unit 340 displays a drawing as illustrated in FIG. 4 on the display 310 so as to allow a driver to directly set the rotation safe-distance area and the sensor recognition area. Further, the control unit 340 makes a pattern of fixed objects 43 and 44 using the ultrasonic sensor 330. That is, the control unit 340 obtains location values (a distance and an angle) of the fixed objects 43 and 44 measured by the ultrasonic sensor 330 in a stop state (a first position for convenience sake) of the construction machine (for example, excavator) and obtains location values (a distance and an angle) of the fixed objects 43 and 44 measured by the ultrasonic sensor 330 in a rotated state (a second position for convenience sake) of the construction machine, and then makes patterns (that is, a work area pattern) of positions of the fixed objects from the two values to display the patterns on the display 310.

Figure 5:
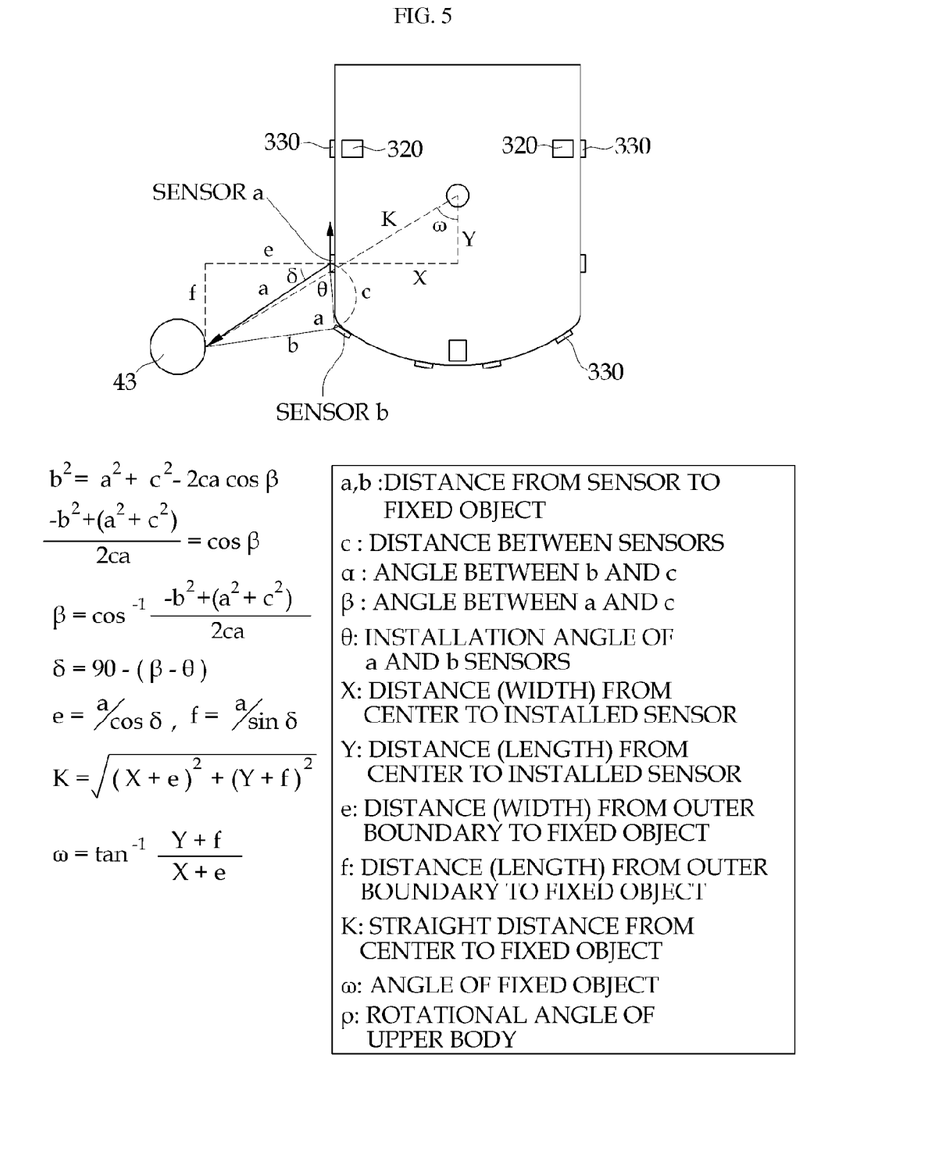
FIG. 5 is an example of calculating a positional value of a fixed object, as a patterning process according to the present invention as an exemplary embodiment of the present invention.
Figure 6:
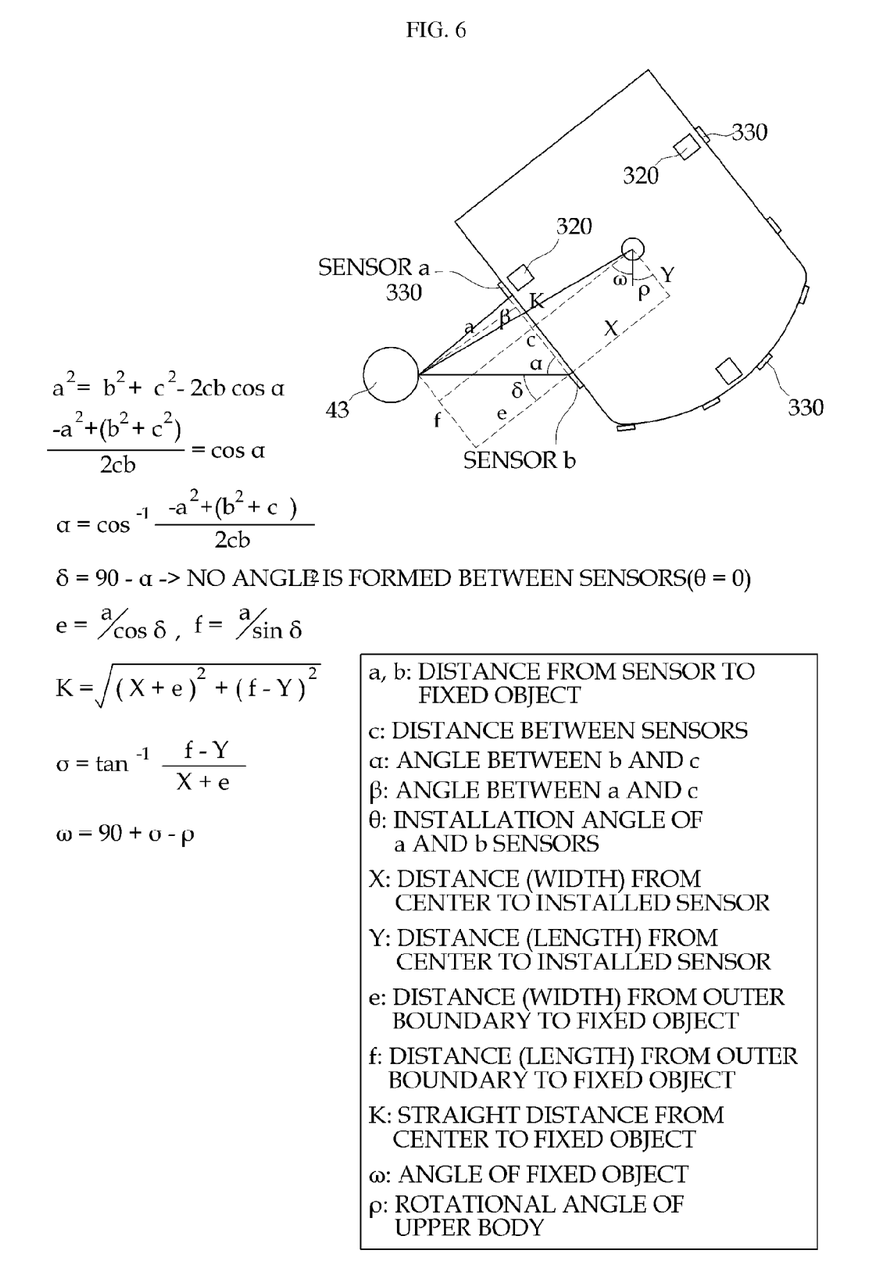
FIG. 6 is an example of calculating a positional value of a fixed object after rotatably moving the construction machine, as a patterning process according to the present invention as an exemplary embodiment of the present invention.

FIGS. 5 and 6 are views illustrating a method of obtaining a location value of the fixed object according to the present invention as a process of patterning a safe-distance and equations.

FIG. 5 is an example of calculating a positional value of a fixed object, as a patterning process according to the present invention as an exemplary embodiment of the present invention.

FIG. 6 is an example of calculating a positional value of a fixed object after rotatably moving the construction machine, as a patterning process according to the present invention as an exemplary embodiment of the present invention.

Hereinafter, the exemplary embodiment of the present invention will be described with reference to FIGS. 5 and 6.

In FIGS. 5 and 6, the location values (a distance and an angle) of the fixed object 43 may be calculated using trigonometric formulas. In FIGS. 5 and 6, the location values of the fixed object 43 may be represented by a distance (that is, a "K" value) from a center of the construction machine 40 to the fixed object 43 and an angle (that is, "ω"). In FIG. 6, the distance "K" and the angle "ω" may be calculated by the trigonometric formulas. The results are expressed by Equations 1 and 2.

$$K=\sqrt{(X+e)^2+(Y+f)^2}$$ Equation 1

In Equation 1, "X" is a distance from the center of the construction machine 40 to the sensor (sensor b) in a horizontal direction (an x-axis). "e" is a distance from the sensor (sensor b) to the fixed object 43 in the horizontal direction (x axis). "Y" is a distance from the center of the construction machine 40 to the sensor (sensor b) in a vertical direction (a y-axis). "f" is a distance from the sensor (sensor b) to the fixed object 43 in the vertical direction (y axis).

$$\omega = \tan^{-1}\frac{Y+f}{X+e}$$ Equation 2

The control unit 340 stores the results of Equations 1 and 2 in a memory (not illustrated) as location values of the fixed object 43.

In order to read out the position of the fixed object, after the upper body of the construction machine 40 rotates at an angle "ρ" as illustrated in FIG. 6, the control unit 340 calculates the location values of the fixed object 43 using sensors (sensor a and sensor b) by a method as illustrated in FIG. 5. The results are expressed by Equations 3 and 4.

$$K = \sqrt{(X+e)^2 + (f-Y)^2}$$ Equation 3

$$\sigma = \tan^{-1}\frac{f-Y}{X+e}$$ Equation 4

In the meantime, from the result of Equation 4, the angle "ω" of the location values of the fixed object 43 may be obtained by Equation 5.

$$\omega = 90+\sigma-\rho$$ Equation 5

That is, in FIG. 6, the control unit 340 calculates the location values (that is, the distance K and the angle ω) of the fixed object 43 using the angle "ρ" at which the upper body of the construction machine 40 moves.

Therefore, when the location values of FIG. 5 for the fixed object 43 is equal to the location values of FIG. 6 for the fixed object 43, the control unit 340 reads out the fixed object 43 as a fixed object.

Using the above-described method, the control unit 340 obtains location values of other fixed objects and displays the obtained location values on the display 310.

In the meantime, when the control unit 340 obtains the location values of the fixed objects 43 and 44, the control unit 340 uses at least one sensor (for example, sensor a and sensor b as illustrated in FIGS. 5 and 6).

When "K"<"max X" or "K"<"max Y" as a result of operating the location values of the fixed object of FIGS. 5 and 6, the control unit 340 determines that the fixed object is located within a working radius of the construction machine 40 and issues a warning sound or displays an alarm on the display to prevent a negligent accident. Here, "max X" is a horizontal distance from the center of the excavator to a sensor installation position and "max Y" is a vertical distance from the center of the excavator to the sensor installation position.

Figure 7:
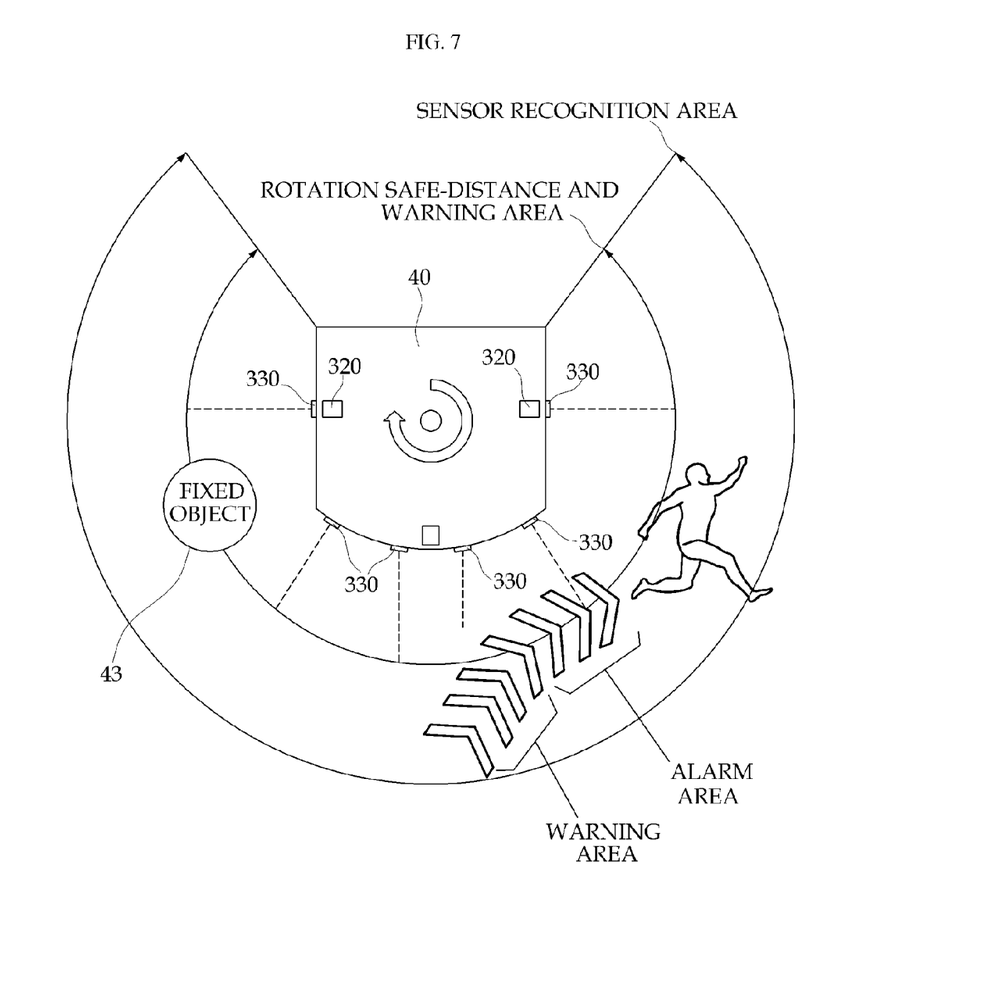
FIG. 7 is an example of sensing an object using a sensing device of a construction machine according to the present invention as an exemplary embodiment of the present invention.

FIG. 7 is an example of sensing an object using a sensing device of a construction machine according to the present invention as an exemplary embodiment of the present invention.

Figure 8:
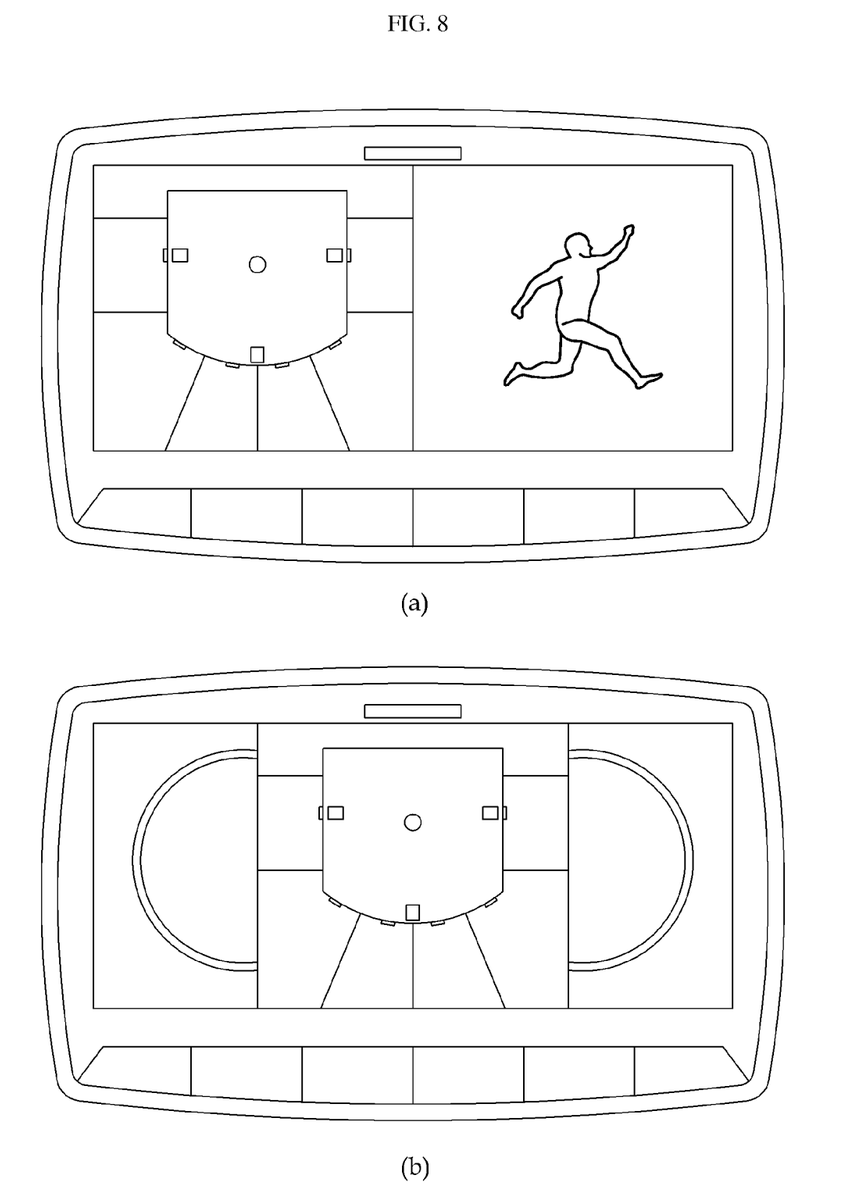
FIG. 8 is an example illustrating a method of patterning a safe-distance and a work area on a display and sensing an object as an exemplary embodiment of the present invention.

FIG. 8 is an example illustrating a method of patterning a safe-distance and a work area on a display and sensing an object as an exemplary embodiment of the present invention.

As illustrated in FIGS. 7 and 8, when a driver (or a user) works with the construction machine or rotates the construction machine and another object excluding the fixed object is sensed, a pattern of the safe-distance (or a work area) and/or an image captured by the camera 320 are displayed on the display 310. The control unit 340 may display the image of the object captured by the camera 320 on the display 310, as illustrated in FIG. 8A, while displaying the safe-distance (work area) pattern on the display 310. In the meantime, when the camera 320 is not mounted or does not capture the object, as illustrated in FIG. 8B, the control unit displays only the safe-distance (or the work area) pattern and notifies the driver that the object is sensed using a warning sound, to prevent a negligent accident. Further, the control unit 340 may notify the driver (the user or the operator) that the object is sensed through two steps. That is, as illustrated in FIG. 7, when the object is sensed in the "sensor recognition area", the control unit 340 issues a warning first and then when the object is sensed in the "rotation safe-distance area", the control unit 340 issues a warning sound to prevent a negligent accident.

Figure 9:
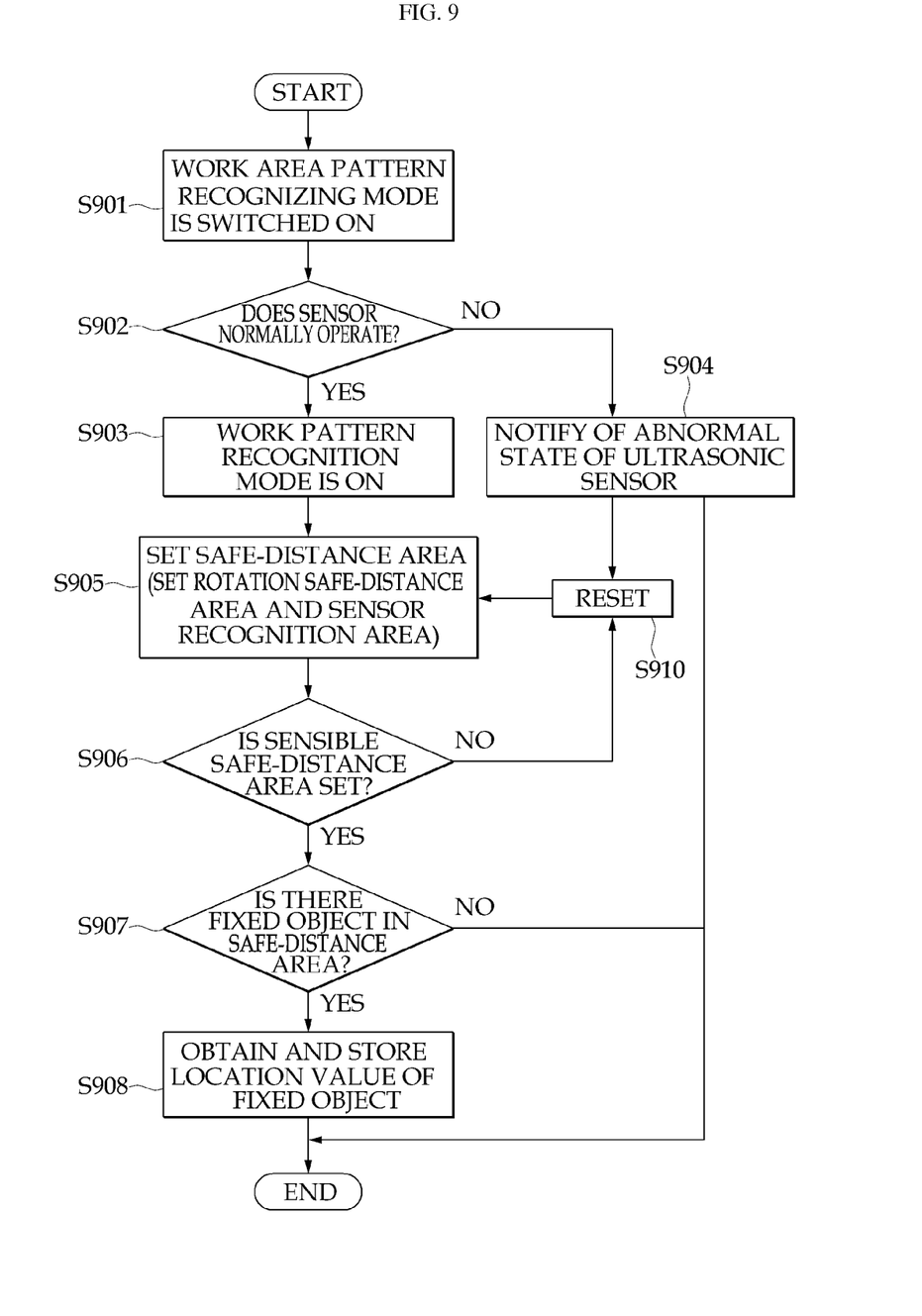
FIG. 9 is a flowchart illustrating a method of patterning a work area in order to sense an object by a construction machine according to the present invention as an exemplary embodiment of the present invention.

FIG. 9 is a flowchart illustrating a method of patterning a work area in order to sense an object by a construction machine according to the present invention as an exemplary embodiment of the present invention.

Referring to FIG. 9, the driver (user) activates a mode (also referred to as "safe-distance area pattern recognizing mode" or "pattern recognizing mode") for a pattern of a safe-distance area (work area) by touching the display (instrument panel) or turning on a switch (S901). The control unit 340 explores whether a series of ultrasonic sensors 330 operate and when the ultrasonic sensor 330 normally operates, the "pattern recognizing mode" operates (S902 and S903). When the ultrasonic sensor 330 does not normally operate, the control unit 340 notifies the driver of the abnormal state of the ultrasonic sensor 330 through an alarm sound and/or the display 310 (S904).

The driver may set the "safe-distance area (or work area)" in consideration of an operating radius of the construction machine in step S905. In step S905, the "rotation safe-distance area" and the "sensor recognition area" are set. Further, when a value set in step S905 is smaller than a minimum value (that is, a rotation radius where the upper portion of the construction machine operates) for safe or the set value is larger than a maximum distance value which may be sensed by the sensor 330 in step S906, the "safe-distance area" is reset (S910). Otherwise, the "safe-distance area" is normally set. The control unit 340 senses a fixed object which is sensed within the "safe-distance area" by the ultrasonic sensor 330. When the fixed object is detected within the "safe-distance area" set in step S905 (step S907), the control unit 340 calculates location values (that is, the distance K and the angle ω) of the detected fixed objects and stores the location values in the memory (S908) as described in detail with reference to FIGS. 5 and 6.

Figure 10:
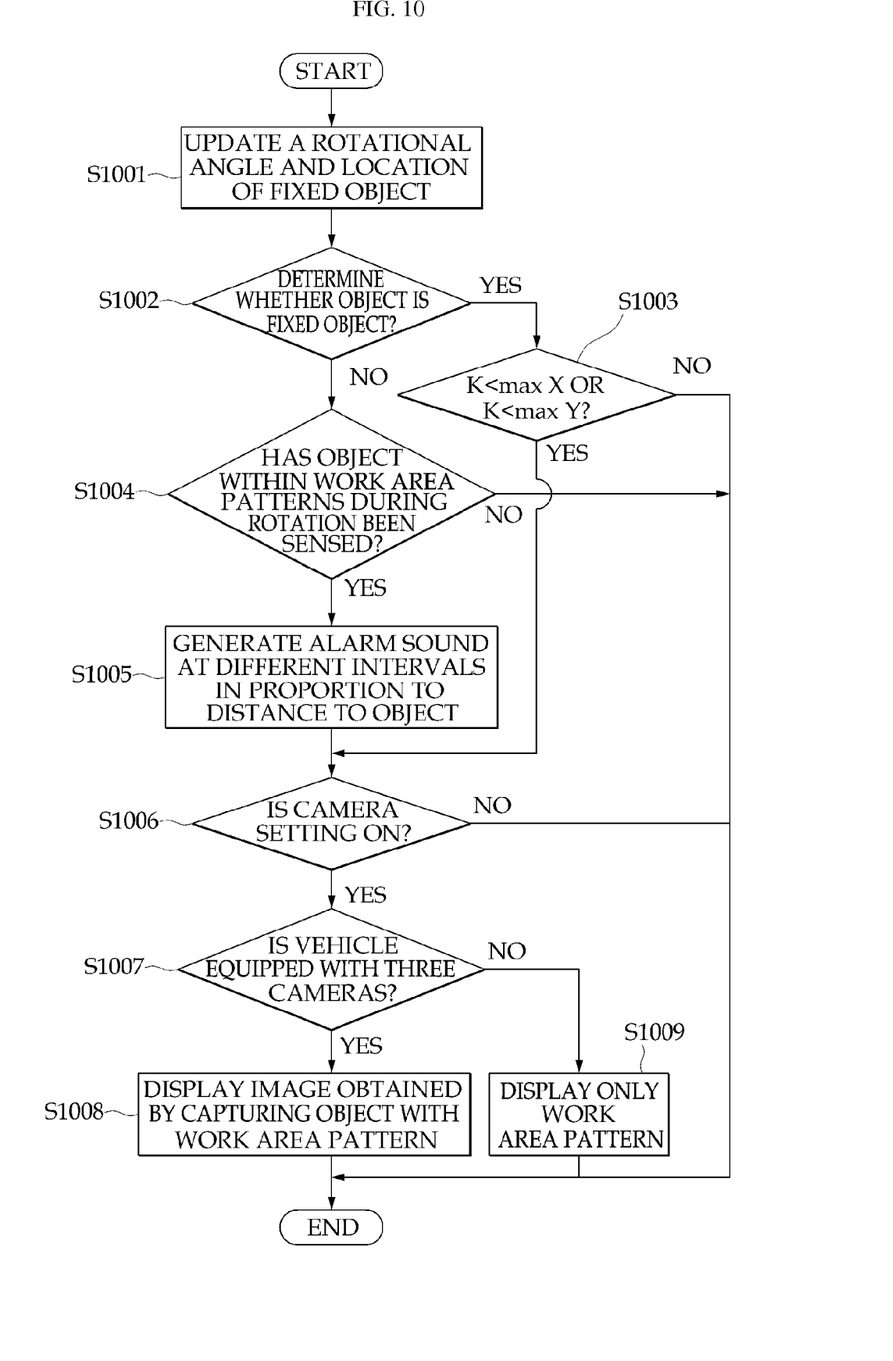
FIG. 10 is a flowchart illustrating a method of sensing an object by an object sensing device of a construction machine according to the present invention as an exemplary embodiment of the present invention.

FIG. 10 is a flowchart illustrating a method of sensing an object by an object sensing device of a construction machine according to the present invention as an exemplary embodiment of the present invention.

When the upper portion or the lower portion of the construction machine rotatably moves as the construction machine is manipulated, the control unit 340 updates location values of the fixed object (S1001). In step S1001, the location values of the fixed object are as described with reference to FIGS. 5 and 6.

The control unit 340 compares the location values (that is, the values stored in step S908 of FIG. 9) of the fixed object which are stored when the pattern of the work area is made with the location values of the fixed object which are updated in accordance with the rotation and/or movement of the construction machine to determine whether an object is a fixed object or a moving object (S1002). When the object is the fixed object in step S1002, a distance from a center of the construction machine (for example, an excavator) to a sensor installation position (that is, a width "max X" and a length "max Y") is larger than a distance (that is, K) from the center of the construction machine to the fixed object (S1003). In this case, the fixed object is captured by the cameras 320 which are mounted in the side area and/or the rear area of the construction machine and displayed on the display 310 (S1006 to S1008).

In the meantime, when the control unit 340 determines that the object detected in the work area pattern is not the fixed object (S1002), the control unit 340 senses an object in the work area pattern in accordance with rotation of the construction machine (S1004). When the object is sensed in step S1004, the control unit 340 issues different alarm sounds in accordance with the distance where the object is sensed (S1005). For example, when the object is sensed at a distance close to the center in the work area pattern, an interval of the alarm sound is short and when the object is sensed at an outer boundary of the work area pattern, an interval of the alarm sound is relatively long.

Further, the sensed object is captured by the cameras 320 which are mounted in the side area and/or the rear area of the construction machine and displayed on the display 310 (S1006 to S1008). Steps S1006 to S1008 will be described in more detail. When the camera 320 is set to be on (S1006) and three cameras 320 are mounted at both sides and a rear side of the construction machine, respectively (S1007), a camera (which is closest to the object) 320 captures the sensed object and the captured image is displayed on the display (S1008).

In the meantime, when the camera 320 is not mounted in the construction machine or the object is located in the blind spot of the camera 320 so that the object is not captured in step S1007, only an image of the work area pattern is displayed on the display (S1009).

The above-described exemplary embodiments of the present invention may be created by a computer executable program and implemented in a general use digital computer which operates the program using a computer readable recording medium. The computer readable recording medium includes a magnetic storage medium (for example, a ROM, a floppy disk, and hard disk), and a storing medium such as an optical reading medium (for example, CD-ROM, a DVD).

Until now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it should be interpreted that all differences within an equivalent range thereto may be included in the present invention.

The invention claimed is:

1. An object sensing method of a construction machine, comprising:
    (A) setting a safe-distance area and obtaining location values of at least one fixed object to form a work area pattern, wherein the location values are obtained using a sensing sensor mounted at a side of the construction machine;
    (B) updating the location values by detecting an object in the work area pattern in accordance with rotation and movement of the construction machine;
    (C) determining whether the detected object is a fixed object in the work area pattern; and
    (D) notifying that there is an object detected in the work area pattern when it is determined that the detected object is not the fixed object.

2. The object sensing method of claim 1, wherein in operation A, the location values of the fixed object include a distance from a selected part of the construction machine to the fixed object and an angle of the fixed object.

3. The object sensing method of claim 1, wherein in operation (A), the safe-distance area is set by distinguishing a rotation safe-distance area and a sensor recognition area in consideration of an operation rotational radius of the construction machine.

4. The object sensing method of claim 1, wherein in operation (C), when the location values of the fixed object of the work area pattern formed in operation (A) are equal to the location values of the object detected in operation (B), it is determined that the detected object is the fixed object.

5. The object sensing method of claim 1, wherein operation (D) includes notifying that there is an object detected within the work area pattern using an alarm sound.

6. The object sensing method of claim 1, wherein operation (D) includes:
    capturing, by a camera, an object which is detected in the work area pattern; and
    displaying a captured image of the object with the work area pattern.

7. The object sensing method of claim 1, further comprising:
    determining whether the detected object is in the rotation safe-distance area of the work area pattern when it is determined that the detected object is the fixed object within the work area pattern; and
    displaying an image obtained by capturing the detected object when it is determined that the detected object is within the rotation safe-distance area of the work area pattern.

8. An object sensing device of a construction machine, comprising:
    a display which is mounted in a vehicle of a construction machine and displays a work area pattern and a captured image of an object;
    at least one camera which is mounted on a side of the construction machine to capture an image of an object;
    at least one sensor which is mounted on the side of the at least one camera and senses positions of a fixed object and a moving object; and
    a control unit which controls to set a safe-distance area in consideration with the sensor, performs a patterning work of the work area using sensing information on the fixed object, and displays a captured image of the moving object on the display when the moving object is sensed within the set safe-distance area.

9. The object sensing device of claim 8, wherein the control unit obtains location values of the fixed object in the work area pattern through the sensor in a stop state of the construction machine and updates the location values by detecting an object in the work area pattern through the sensor in a rotated state of the construction machine, and then compares the obtained location values with the updated location values so that when the two location values are equal to each other, it is determined that the detected object is a fixed object in the work area pattern.

10. The object sensing device of claim 8, wherein the control unit obtains location values of the fixed object measured by the sensor in a stop state of the construction machine and obtains the location values of the fixed object measured by the sensor in a rotated state of the construction machine, and then performs the patterning work of the work area using the two obtained location values.

11. An object sensing method of a construction machine, comprising:
    setting a safe-distance area and receiving location values of at least one fixed object to form a work area pattern;
    updating the location values by detecting an object in the work area pattern in accordance with rotation and movement of the construction machine;
    determining whether the detected object is a fixed object in the work area pattern; and
    displaying a graphical indication of the detected object with the work area pattern when it is determined that the detected object is not the fixed object.

12. The object sensing method of claim 11, further comprising obtaining the location values using a sensing sensor mounted at a side of the construction machine.

13. The object sensing method of claim 11, further comprising capturing, by a camera, the detected object, and wherein the displaying of the graphical indication of the detected object includes a displaying of the captured object.

* * * * *